Patented Aug. 26, 1930

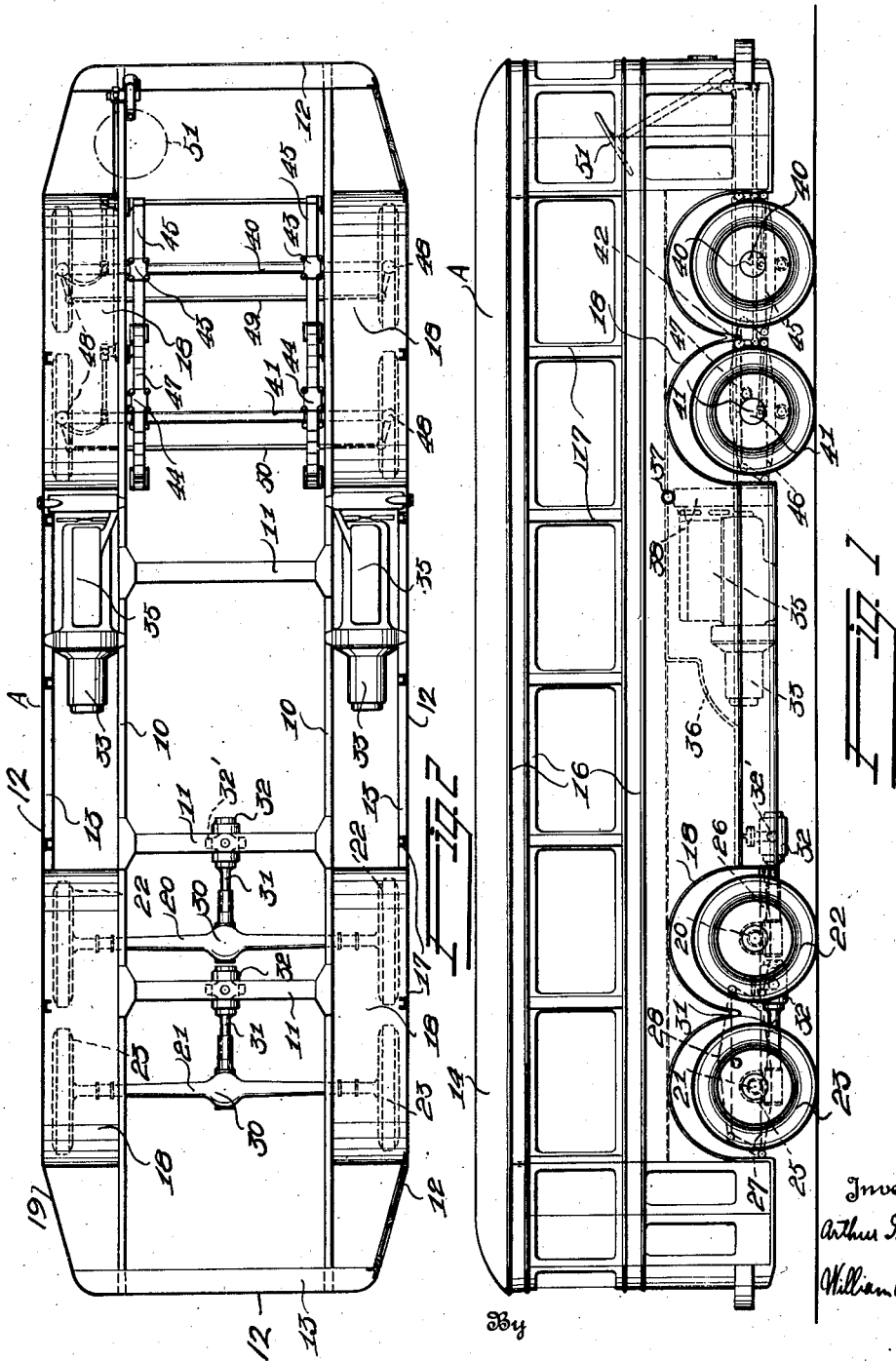

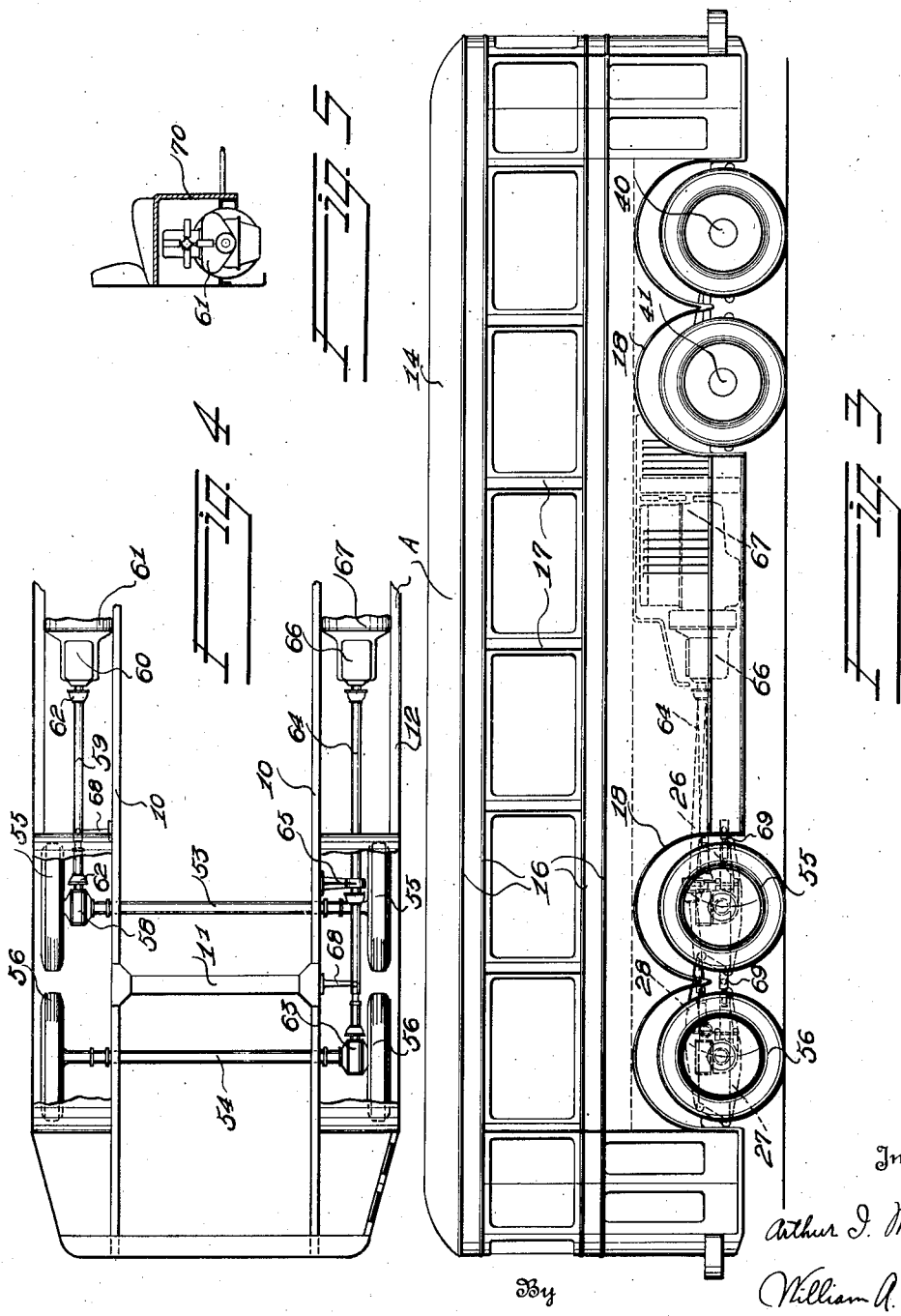

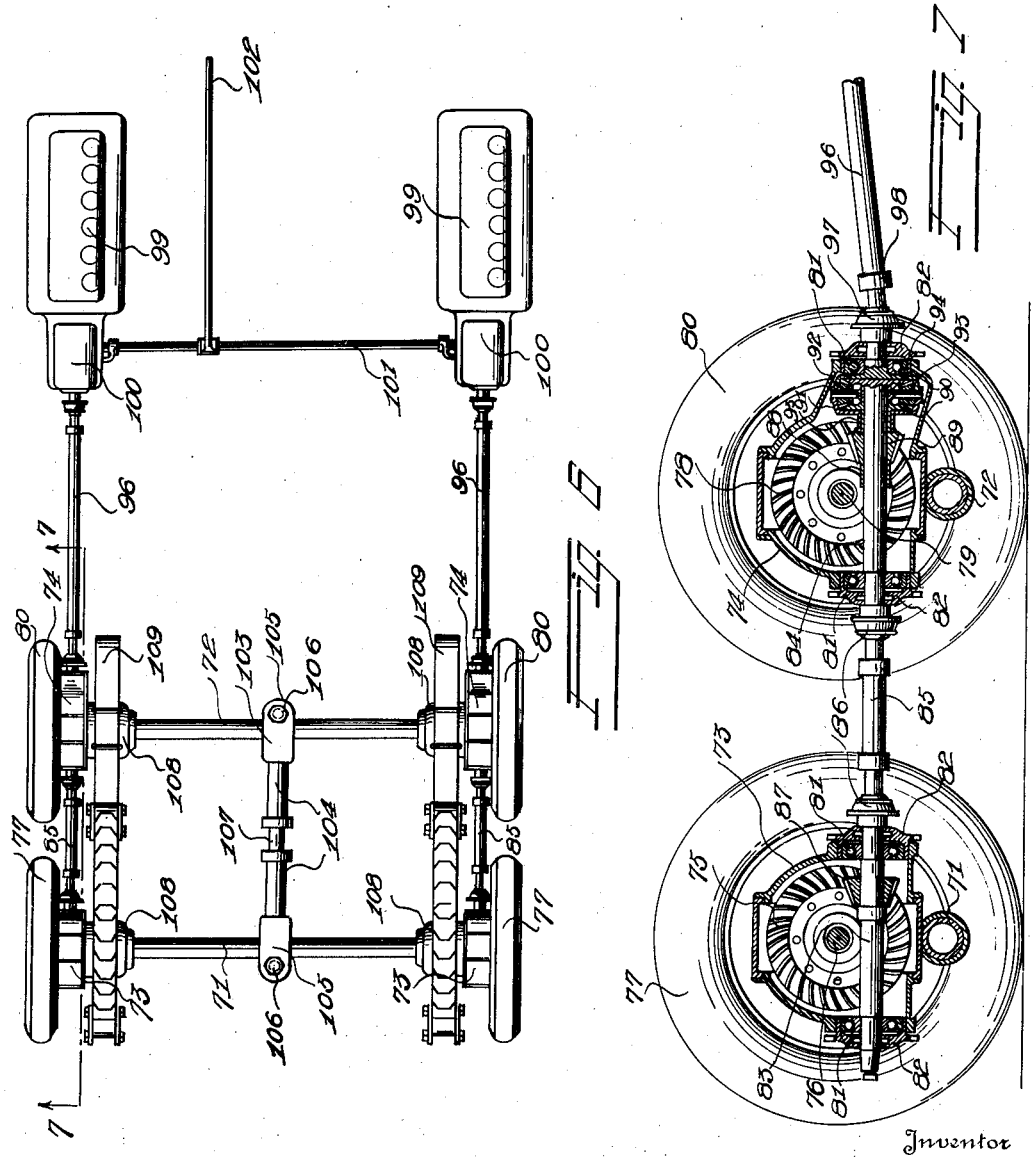

1,773,782

UNITED STATES PATENT OFFICE

ARTHUR I. MARCUM, OF OAKLAND, CALIFORNIA, ASSIGNOR TO EMORY WINSHIP, OF MACON, GEORGIA

MOTOR-VEHICLE CONSTRUCTION

Application filed October 22, 1927. Serial No. 228,028.

The present invention relates to new and useful improvements in dual motor automotive vehicles.

One of the objects of the present invention is the provision of an automotive vehicle of light but strong construction in which the body thereof is constructed of relatively light material so arranged and formed as to be capable of itself supporting the power units, transmission and driving mechanism without the utilization of the usual heavy chassis frame construction.

A further object of the invention is the provision of an automotive vehicle of the gas-electric type in which the body is so constructed as to extend the full length of the vehicle, and in which the power and driving mechanism are housed beneath said body in such a low position and so located with respect to the walls that the entire base area of the body can be utilized in carrying passengers or merchandise.

A still further object of the present invention is the provision of an automotive vehicle of the gas-electric type including a novel arrangement of power and transmission devices relative to the body such that the parts are maintained in better balanced relation than in the vehicles of this type heretofore designed for the purposes.

A further object of the invention is to provide a road vehicle embodying a plurality of gasoline motors and electric generators arranged to present a balanced structure in which, at the same time, the motors and generators are disposed so that they will not encroach on the available passenger carrying space within the body of the vehicle.

A still further object of the invention is to provide a road vehicle of the multi-wheel type embodying a plurality of driven axles in which the axles are separately driven by a motor individual to each axle, and in which the motors are arranged relatively close to the axles to avoid the use of relatively long flexible drive shafts.

A still further object of the invention is to provide a road vehicle embodying a plurality of driven axles and a separate motor for each axle in which the driving torque reactions of the axles are separately resisted by the frame at a point adjacent the application of the driving force to localize the resultant stresses and to utilize the frame to directly resist them independently of the movable parts of the vehicle. Still another object of the invention is the provision of a road vehicle embodying tandem drive wheels and a common compensated drive for each pair of wheels.

Other objects of the invention and the means by which the enumerated objects are accomplished as well as the benefits derived therefrom will be referred to in the course of the following description.

For a more complete understanding of the present invention reference will be made to the accompanying drawing forming part of this application and in which—

Figure 1 is a side elevation of the vehicle.

Figure 2 is a horizontal sectional view showing the arrangement of the power and transmission devices and the relation thereof to the body of the vehicle.

Figure 3 is a side elevational view similar to Figure 1, but depicting a modification.

Figure 4 is a fragmental horizontal sectional view of the structure shown in Figure 3, and Figure 5 is a section illustrating the arrangement of seats over the engines.

Figure 6 is a top plan view of the rear portion of the chassis depicting a further modification of my invention.

Figure 7 is an enlarged longitudinal sectional view on the line 7—7 of Figure 6.

The present invention hereinafter described is embodied in a vehicle for the conveyance of passengers and merchandise intended to perform the same functions as standard forms of automotive stages or busses.

This invention differs from the conventional form of automotive vehicle propelled by a self-contained power generating unit such as an internal combustion engine or gas-electric combination in that, in place of providing a chassis of the usual heavy construction to which the body is secured, the chassis frame is eliminated and the body constructed of relatively light material to form a trussed structure capable of being directly arranged on the axles and itself sustaining the weight of the power and transmission mechanism, thus providing a construction which is lighter and more durable than similar constructions commonly employed.

Referring to the drawings by reference characters in which like characters designate like parts, the character A designates the novel body construction which comprises a base supporting and strengthening portion consisting of a pair of channel members 10 which extend longitudinally of the body and parallel to each other. Extending transversely of the body and connected at their ends to the channel members 10 are a plurality of parallel bars 11. The members 10 and 11 are relatively light as compared with the commonly used chassis members and form the base frame work of the unitary body construction.

The base portion is adapted to receive a suitable flooring which extends the full length of members 10 and extends laterally beyond the same.

Side and end walls 12 are provided which are constructed of light weight material and adjacent the base portion are provided with angle bar stiffeners 13 which also serve as a means by which the walls are secured to the base portion. A suitable top or roof 14 is secured to the upper margins of the side and end walls 12. The side and end walls are strengthened or reinforced by longitudinally extending bars 16 and vertically extending bars 17. The bars 16 and 17 are preferably angle iron bars of U-shape in section as indicated in Figure 2 and the lower ends of the vertical bars 17 are supported on and connected to the marginal angle bar stiffeners 13.

All of the bars entering into the construction of the body are of relatively light weight, particularly so as compared with the ordinary heavy chassis members and yet due to their arrangement provide a truss-like body that is light, and yet very strong and durable.

The body is further provided with the wheel housings 18 which as indicated on the drawings are curved to conform to the peripheral outline of the wheels and extend laterally of the body from the channel members 10 to the outer sides of the body. The housings 18 not only serve to house the wheels but further provide a means for reinforcing the body adjacent the corners thereof. As is clearly shown in Figure 2 of the drawing, the end portions of the side walls converge inwardly towards the end of the body as indicated at 19, to provide a construction neat in appearance and offering reduced obstruction in turning comparatively sharp corners. Owing to the comparatively long body A and the comparative narrow streets and roadways met in populated districts where the bus traffic is greatest, considerable difficulty is experienced in making turns particularly, sharp turns as at street intersections, where the ends of the sides of the body extend throughout their length in the same planes. By providing the tapered sections 19 considerably greater clearance for turning is provided and this is an important feature of my invention.

The rear end of the body is supported by a pair of parallel drive axles 20 and 21 which in turn are supported by the pair of pneumatic tired wheels 22 and 23 respectively, housed by the body. Supported from the housing of each of the axles 20 and 21 by means of suitably journaled or universal ball and socket joints or connections are the spring supporting saddles 25. Secured to and supported from the saddles 25 at points intermediate their ends and preferably at the rear of the centers thereof are pairs of springs 26 and 27 the rear ends of which are connected to the ends of equalizing springs 28 by link connections as more fully set forth in my copending application Serial No. 54,560 filed September 4, 1925.

The axles 20 and 21 are each of any standard or well known type, each comprising the differential mechanism 30 each of which is driven by means of a telescoping or splined shaft 31 which in turn is driven by means of an electric motor 32, which electric motors are pivoted in yokes the arms of which project beneath the parallel cross bars 11 as shown at 32. By this arrangement, the motors can swing on their pivots as the axles move in accordance with road irregularities.

The motors 32 are supplied with current by suitable connections from the generators 33 which in turn are operated by means of the internal combustion engines 35 which as clearly illustrated in Figure 2 are located adjacent the sides of the body and substantially centrally of the ends thereof.

As is indicated in Figure 1 the engines partially project above the floor of the body and in order to utilize the space within the body directly over the engines, the engines are suitably enclosed by a non-heat conducting cover element 36 over which may be placed one or more seats or the cover element may serve to support baggage. The engines are supplied with fuel through the inlet pipes 37 in the sides of the body which inlet pipes communicate with the tanks 38.

The forward end of the body is supported on a pair of axles 40 and 41 each carrying a pair of dirigible wheels by spring suspensions indicated as a whole by the reference character 42.

At this point it will be readily appreciated that the vehicle could be equipped with only one front axle and accompanying pair of steering wheels without any change in the body construction and arrangement of the power and drive mechanism except for the reinforcement 18 which would be modified if only one pair of steering wheels were employed.

Suitably journaled on the axles 40 and 41 are the spring supporting saddles 43 and 44 respectively and secured to the saddles 43 and 44 are the leaf springs 45 and 46 respectively. The springs 45 and 46 are connected at their rear ends to the opposite ends of equalizing leaf springs 47 by link connections as more fully set forth in my co-pending application Serial No. 54,560.

The dirigible wheels are secured to the axles 40 and 41 by king pins 48 preferably arranged vertically and with their axes substantially in the planes bisecting the tread surfaces of the wheels.

Drag links 49 and 50 extending parallel to the axles 40 and 41 connect the wheels for simultaneous movement about the pins 48. A steering wheel 51 is provided and is operatively connected with the drag links as more fully set forth in my co-pending application No. 719,490.

In Figures 3, 4 and 5 are illustrated a modification of the structure above described wherein each pair of drive wheels is independently driven by a separate drive shaft and motor.

In this form of the invention the spring suspensions for both the steering wheels and drive wheels and the steering mechanism is the same as in Figures 1 and 2 and accordingly will not be described but are represented by the same reference characters. It will be noted that in this form of the invention only one rear cross bar 11 is employed since no necessity exists for the employment of two as is the case with the construction shown in Figures 1 and 2.

Extending transversely of the body at the rear end thereof are the axles 53 and 54 which carry the pairs of pneumatic tired wheels 55 and 56 respectively. Associated with the axle 53 adjacent one end thereof is a differential mechanism 58 which is driven by means of the telescoping drive shaft 59 which in turn is driven through the transmission or gear set 60 which is in connection with the motor or internal combustion engine 61. The shaft 59 is provided adjacent each end thereof with a flexible or universal joint 62. The other axle 54 adjacent one end thereof and opposite to the end of the axle 53 provided with the differential 58 is provided with a differential 63 which is driven by means of a telescoping drive shaft 64 which is supported intermediate its ends by a suitable bracket 65 supported by one of the longitudinal bars 10.

The shaft 64 is driven from a transmission or gear set 66 associated with a motor or internal combustion engine 67. As either journaled or universal connections are provided between the axles 53 and 54 and the springs 26 and 27 provision must be made to prevent rotation of the axles about the supporting wheel centers and to compensate for the driving and braking reaction. Accordingly each axle adjacent its respective drive shaft is connected to a bracket 68 carried by the bars 10 by a telescoping torque member 69 which member at one end is pivotally connected to the axle for movement about a substantially vertical axis and at its other end to said bracket, preferably, by a universal joint. Intermediate its ends said torque member has a telescoping action.

Figure 5 illustrates the application of a seat 70 over the motor 61 or 67 in order to utilize all the base area of the body. In Figures 6 and 7 is shown a further modification of my invention in which the tandem drive wheels at each side of the vehicle are separately and independently driven by a separate motor. In this form of invention, a pair of transversely extending longitudinally spaced drop axles 71 and 72 are provided. Axles 71 and 72 are preferably formed with a central tubular section to the ends of which suitable driving gear housings 73 and 74 are secured. Mounted within each housing 73 is a hypoid master gear 75 which is suitably secured to driving stub axle shaft 76 which extends inwardly from, and drives the wheel 77.

Similarly, a hypoid master gear 78 is mounted within each housing 74 and is secured to and drives stub axle shafts 79 of wheels 80.

Housings 73 and 74 are each provided at each end thereof, with ball bearing assemblies 81 held in position in suitable openings in the housings by means of centrally apertured adjustable bearing cages 82.

Extending through housings 73 and 74 respectively and journaled in bearings 81 thereof at each side of the vehicle are drive shaft sections 83 and 84, coupled together by means of telescopic intermediate shaft sections 85 and universal or flexible joints 86. Secured to and driven by each shaft section 83 within each housing 73 is a hypoid pinion 87 adapted to mesh with and drive the corresponding hypoid gears 75.

In order to equalize the drive on wheels 77 and 80 on each side of the vehicle a compensating differential is mounted in a forwardly extending enlargement of each housing 74 as clearly shown in Figure 7 each of which comprises a sleeve 88 journaled for rotation on shaft section 84 which has formed integrally therewith, a hypoid pinion 89 adapted to mesh with and actuate the corresponding hypoid gear 78. Formed integrally with the forward end of the sleeve 88 and shaft section 84 respectively are the differential bevel gears 90 which are nested and rotatably supported within a differential housing 91. Meshing with and driving gears 90 are the differential pinions 92 which in turn are rotatably supported on spindles 93, the inner ends of which are secured in and rotatable with differential housing 91. Spindles 93 are formed integrally with a ring or bearing member 94 in which the forward end of shaft section 84 is rotatably supported.

Housing 91 is preferably split in the plane of the axes of spindles 93 and the halves thereof are secured together by suitable bolts (not shown). A tubular extension 95 journaled on the exterior of sleeve 88 between pinion 89 and gear 90 is formed integrally with the rear half of housing 91 and formed integrally with the forward half of the housing is the propeller shaft section 96 which is provided with the flexible joints 97 and telescopic joints 98.

Each propeller shaft section 96 extends forwardly and upwardly as indicated in Figure 7, to a motor 99. Motors are located within and substantially centrally of the length of the body as indicated in Figure 1. Each motor is provided with a suitable selective gear set 100. Gear sets 100 are connected for simultaneous operation by means of the shaft 101 to which a suitable actuating rod 102 is secured.

A suitable torque resisting construction 103 is provided to prevent rotation of the axles about the supporting wheel centers and to compensate for the driving and braking reactions and comprises a pair of tubular members 104, each provided on one end thereof with a bifurcated head member 105 pivotally secured to suitable extensions, of the axles 71 and 72 by means of vertical pins 106. A relatively short shaft member 107 is rigidly secured at one end thereof within one end of one of the tubular members 104 and has the other end thereof telescoped within the end of the other tubular member 104 in a manner permitting relative rotary and sliding motion.

The axles 71 and 72 adjacent the ends thereof and in proximity to the gear housings 73 and 74 are provided with suitable spring supporting saddles 108 upon which saddles of springs 109, of the character above described and as shown in Figure 1 are supported.

It will thus be seen that a vehicle drive arrangement is provided in which the tandem drive wheels on each side of the vehicle are differentially driven separately and independently of the tandem drive wheels at the opposite side of the vehicle, and that the motors individual to the respective opposite pairs of tandem drive wheels automatically compensate for the drive on opposite sides of the vehicle.

It will thus be seen that a vehicle is provided in which the body thereof is so formed as to be relatively light yet very durable and which will accommodate the maximum of passengers or merchandise and further will accommodate the power and drive mechanism in such relations that the vehicle will be very stable thus lessening the strains to which the vehicle is subject in operation as well as providing a vehicle which is comfortable to ride in.

Having thus set forth my invention, what I claim and desire to secure by United States Letters Patent is:—

1. A road vehicle comprising a rigid box-like body of substantially uniform height from end to end thereof, a plurality of axles, including a pair of driven axles, arranged beneath, and housed by said body, wheels supporting said axles and housed by said body, springs interconnecting said axles and body, and a plurality of motors for separately driving said driven axles, said motors being symmetrically arranged with respect to a central longitudinal line passing through said body.

2. A road vehicle comprising a rigid box-like body constructed of relatively light longitudinal and transverse members associated to form a box-like structure having a substantially uniform height from end to end, a plurality of axles including a pair of driven axles arranged in spaced relation beneath said body, wheels arranged beneath and housed by said body, springs interconnecting said axles to said body, a pair of internal combustion engines supported on opposite sides of said body adjacent the lower edge thereof, and means to cause said motors to independently drive said driven axles, said means being substantially evenly balanced with respect to a central longitudinal line passing through said body.

3. A road vehicle comprising a rigid box-like body built up of relatively light transverse and longitudinal structural members rigidly secured together and consituting a body having substantially the same height from end to end, a plurality of axles including a pair of driven axles, arranged beneath said body and secured thereto in spaced relation by springs, wheels supporting said axles, said wheels being arranged within the lines of said body and housed thereby, internal combustion engine supported solely by said body on each side and adjacent the bottom thereof, said body being provided with recesses to receive said wheels, the upper limits of said recesses being substantially coincident with the upper limits of said engines.

4. A road vehicle comprising a rigid box-like body, designed to carry passengers, said body comprising a plurality of relatively light longitudinal and transverse structural members rigidly secured together, the interior height of said body being substantially the same from end to end, a plurality of axles including a pair of driven axles, a pair of wheels for each axle, springs connecting each axle to said body, said axles and wheels being arranged beneath and held in spaced relation by said body, the wheels being set in recesses provided in the body, a pair of internal combustion engines arranged at each side of said body between certain of said wheels, and means to drive said axles separately, said engines being arranged within said body and supported thereby in such low position that the motors lie substantially below the horizontal lines bounding the tops of said wheel recesses.

5. A road vehicle including a body, a pair of drive axles supporting one end of said body, power generating means arranged at each side of the body and means including a pair of motors independently connected to said axles for driving said vehicle.

6. A road vehicle of the gas-electric type comprising a body, a pair of drive axles, a motor and generator arranged at each side of said body between the ends thereof, an electric motor for each axle arranged centrally of said body, said electric motors being individually driven from said generators, and means operatively connecting said motors and axles.

7. A road vehicle comprising a frame, a pair of drive axles arranged adjacent one end of said frame, springs interconnecting said axles and frame, a pair of motors arranged at the sides of said frame relatively close to said axles, a flexible shaft connecting the motor on one side of the vehicle to one of said axles, and a second flexible shaft connecting the motor on the other side of said vehicle with the other of said axles.

8. A road vehicle comprising a frame, a pair of driven axles arranged adjacent one end of said frame, springs connecting said axles and frame, a motor arranged at each side of said frame relatively close to said axles, a flexible shaft connecting one of said motors to the forward axle, a second flexible shaft connecting the other motor to the rear axle, said second flexible shaft being supported in bearings arranged adjacent the forward axle.

9. A tandem axle road vehicle comprising a frame, a pair of driven axles arranged adjacent one end of said frame, a pair of motors supported on said frame, a flexible shaft connecting each motor to one of said axles and a torque resisting connection between each of said axles and said frame, said torque resisting connections being arranged adjacent said flexible shafts.

10. A road vehicle comprising a rigid box-like body formed of relatively light transverse and longitudinal structural members rigidly secured together to form a body of uniform height substantially from end to end, a pair of axles for supporting each end of said body, springs interconnecting said axles and body, a pair of wheels for supporting each axle, said wheels being housed in recesses provided in said body, an internal combustion engine supported at each side of said body between the wheels at that side of the body, each engine being arranged so that its drive shaft is approximately in line with the axes of the driven axles whereby said engines do not substantially project within the interior of said body.

11. A road vehicle comprising a box-like body including a frame composed of a plurality of relatively light longitudinal and transverse members rigidly secured together, a plurality of pairs of axles, springs interconnecting said axles and body, power generating means supported on said body between said pairs of axles, said body being of substantially the same height from end to end and of substantially the same width from end to end, and means whereby said internal combustion engines independently drive certain of said axles.

12. In a road vehicle, two pairs of tandem drive wheels, a through drive shaft associated with each pair of drive wheels, said through drive shaft adapted to impart rotation to the rear drive wheel, a differential mechanism associated with said thru drive shaft adapted to impart rotation to the front drive wheel and to equalize the drive on the front and rear wheels.

13. A road vehicle comprising a body, a pair of axles adjacent one end of said body, gear housings supported on the ends of said axles, a hypoid gear journaled in each housing, a drive wheel operatively connected with each gear, a thru drive shaft journaled in the housings at each side of the vehicle, a pinion carried by said thru drive shaft adapted to mesh with and actuate the hypoid gear in the rear housing, a differential mounted in the front housing adapted to differentially drive said shaft and the hypoid gear in the front housing, and a propeller shaft connected with the differential.

14. A road vehicle comprising a body, front and rear gear housings at each side of said body and resiliently connected therewith, each housing having a hypoid gear journaled therein, a thru drive shaft at each side of the vehicle, said drive shaft comprising a pair of sections telescopically connected together, one section journaled in the rear housing and provided with a pinion meshing with the respective gear, the other section journaled in the front housing, a differential mechanism in the front housing adapted to differentially drive said other section and the respective gear, a propeller shaft connected to said differential mechanism, and a motor adapted to impart rotation to said propeller shaft.

15. A road vehicle comprising a rigid box-like body, a pair of drive axles disposed adjacent one end of said body and housed thereby, a motor for each drive axle, said motors being disposed adjacent the sides of said body and being supported thereby, and a flexible drive shaft extending from each motor to one of said drive axles and operatively connected to a differential carried by a drive axle and disposed adjacent an end of an axle.

In testimony whereof I affix my signature.

ARTHUR I. MARCUM.